United States Patent
Coeuré et al.

4,032,217
June 28, 1977

[54] OPTICAL WAVE GUIDE FOR CARRYING OUT PHASE-TUNING BETWEEN TWO MODES OF LIGHT PROPAGATION

[75] Inventors: Philippe Coeuré, Grenoble; Jean Pierre Jadot, Meylan; Jean Claude Peuzin, Eybens, all of France

[73] Assignees: Commissariat a l'Energie Atomique, Paris; Agence Nationale de Valorisation de la Recherche Neuilly-sur-Seine, both of France

[22] Filed: Mar. 24, 1976

[21] Appl. No.: 669,883

[30] Foreign Application Priority Data

Apr. 2, 1975 France .............................. 75.10295

[52] U.S. Cl. .......................... 350/96 WG; 307/88.3; 350/96 C; 350/160 R
[51] Int. Cl.² ............................................. G02B 5/14
[58] Field of Search ....... 350/96 WG, 96 C, 160 R; 307/88.3

[56] References Cited

UNITED STATES PATENTS 3,619,796  11/1971  Seidel ...................... 350/96 WG X

OTHER PUBLICATIONS

Giess et al., "Magneto–Optical Waveguide", IBM Tech. Disc. Bull., Feb. 1975, pp. 2814–2815.

*Primary Examiner*—Edward S. Bauer
*Assistant Examiner*—Stewart Levy
*Attorney, Agent, or Firm*—Burgess, Ryan and Wayne

[57] ABSTRACT

A dielectric film layer $C_2$ is deposited on a transparent film layer $C_1$ in which two optical transverse TE and TM modes propagate and is provided with a metallic coating having reflecting properties on the face which is not in contact with the layer $C_1$. The thickness of the layer $C_2$ is such that phase-tuning is effected along the direction of propagation of the two TE and TM waves within the wave guide as essentially constituted by the layer $C_1$.

11 Claims, 5 Drawing Figures

OPTICAL WAVE GUIDE FOR CARRYING OUT PHASE-TUNING BETWEEN TWO MODES OF LIGHT PROPAGATION

This invention relates to an optical wave guide for carrying out phase-tuning between two modes of light propagation within said guide.

In more general terms, the invention relates to an optical guide employed for channelling and converting wave-propagation modes within the light-wave range: it is known that light can be propagated within an optical wave guide in "guided modes" in a manner which is similar to the propagation of electromagnetic waves (within the Hertzian range) within metal-walled wave guides.

Considerable efforts are being made at the present time in the orientation of research to the phenomena which are associated with propagation and control of light beams travelling within optical wave guides which are usually constituted by thin dielectric films. The final objective of the researches which have been undertaken is to employ these wave guides for transfer of information in the optical range and in the field of communications. The transfer of information in the optical range offers an advantage over the Hertzian range since the higher frequency of optical vibrations permits modulation in the vicinity of the carrier frequency within a frequency band having a width which is about one thousand times that of the Hertzian range. The advent of the laser has considerably facilitated the guiding of light beams.

Thus the extension of concepts employed in microwave techniques to the optical field makes it possible to utilize light energy in the form of guided modes by means of a suitable structure known as a wave guide. In its most simple form, a wave guide serves to confine the light in a single dimension.

A wave guide of this type is usually constituted by a transparent film layer $C_1$ having a refractive index $n_1$, a thickness of the order of a few microns, and deposited on a substrate which is preferably also transparent and has a refractive index $n_2 < n_1$. This medium which has a refractive index of lower value than the transparent film layer serves as a material support. In one configuration which cannot readily be used in practice by reason of the fragility of the film layer $C_1$, this latter may be dispensed with, the layer $n_2$ being accordingly employed alone and surrounded by air ($n_2 = 1 = < n_1$).

Similarly, the medium located above the layer $C_1$ must have a refractive index $n_3$ which is lower than the index $n_1$ of the layer $C_1$. This medium can be simply air but it is also possible to employ a dielectric film which is preferably transparent in order to endow the wave guide constituted by the film layer $C_1$ with higher mechanical strength and better resistance to external agents.

As a result of the higher refractive index of the film layer $C_1$, the waves which propagate within said layer undergo the phenomenon of total reflection from the top and bottom faces of the layer and are thus confined and guided.

For a more precise description of the propagation of these waves within dielectric layers, reference can usefully be made to the article entitled "Guided Wave Optics", Proceedings of the I.E.E.E., volume 62, No 8 — August, 1974, by Messrs. Taylor and Yariv; full explanatory details in regard to these modes of propagation can be obtained from this article which forms part of the description.

Two fundamental modes which are capable of propagating within these wave guides are the transverse electric (TE) mode and the transverse magnetic (TM) mode; these are the two possible wave polarizations which are perpendicular to each other. Throughout the following description and in order to simplify calculations, consideration will be given solely to the case of a wave guide having infinite dimensions along one direction (direction Oy). However, the invention extends to wave guides having limited dimensions and a rectangular or circular cross-section, for example, in which case the calculations are more complicated but have the same character.

Since both the electric and magnetic transverse modes propagate within a wave guide, it is often necessary to excite one mode and to transfer the energy contained in one mode into another mode for reasons of switching and utilization of these modes at the exit of the wave guide (in the construction of true optical integrated circuits).

A number of different design solutions have been proposed in the prior art for transferring energy between two characteristic modes of the wave guide, namely the TE and TM modes. The main difficulty lies in carrying out phase-tuning between these two modes along the entire length of the wave guide in which they are intended to exchange energy.

One known expedient for carrying out phase-tuning consists in periodically modulating the disturbance caused by the energy transfer. This method has been employed in particular in the design of electro-optical and magneto-optical integrated modulators: there are deposited on the layer $C_1$ comb-shaped electrodes (in the case of the electro-optical modulator) or coil-shaped electrodes (in the case of the magneto-optical modulator) in which a current is circulated for producing the necessary fields.

This type of modulation calls for an auxiliary control device which complicates the practical operation; this becomes a major disadvantage in the case of construction of complex devices such as nonreciprocal devices.

A second method of the prior art makes use of a suitably oriented dielectrically anisotropic material deposited on the layer $C_1$ which constitutes the wave guide. At the time of reflection of the TE and TM modes at the interface between the layer $C_1$ and the upper medium, the upper anisotropic dielectric layer delays the TM mode with respect to the TE mode. This upper layer permits equality of the propagation velocities and phase tuning. This method cannot readily be applied since the dielectric anisotropic layer can be formed only with great difficulty: its optical quality must be excellent in order to limit monocrystalline losses having a well-determined crystal orientation. Moreover, said upper layer must be located at a distance from the wave guide $C_1$ which is less than 1000 A and controlled with a very high degree of accuracy.

However, the obtainment of a degenerate system or in other words a wave guide in which equality of phase exists at every point between the two TE and TM modes is practically essential if it is desired to construct complex optical integrated circuits, e.g. the nonreciprocal circuits such as isolator, circulator and the like.

The precise aim of the present invention is to provide an optical wave guide for carrying out phase-tuning between the two modes TE and TM of light propagation within an optical wave guide which provides a high degree of efficiency. The optical wave guide in accordance with the invention for the construction of a degenerate system in which the two modes propagate at the same velocity within the wave guide and carry out phase-tuning at every point does not call for any external supply for the phase-tuning and is not subject to the constructional drawbacks mentioned in the foregoing in connection with the methods of the prior art.

The wave guide in accordance with the invention associates with the film layer $C_1$ in which the TE and TM modes propagate, an additional dielectric film layer $C_2$ which is deposited on the first layer $C_1$ and has a thickness such that phase-tuning is effected in the case of the TE and TM waves along the entire direction of propagation of the two waves within the layer $C_1$. Said additional layer $C_2$ is provided with a metallic coating which is preferably reflecting on that face which is not in contact with the layer $C_1$. As will become apparent hereinafter, the thickness of said layer $C_2$ is calculated so as to carry out the phase-tuning aforesaid while taking into account the different parameters of the wave guide such as the optical indices of the different layers $C_1$ and $C_2$ and possibly also of the dielectric layer $C_3$.

A wave guide for carrying out phase-tuning between these two modes in accordance with the invention is advantageously employed in conjunction with means for coupling two TE and TM modes in order to transfer the energy from one mode into the other, the coupling between the two modes being effected in particular by means of a magnetic field or an electric field.

Further properties and advantages of the invention will become more readily apparent from the following description of exemplified embodiments which are given by way of explanation without any limitation being implied, reference being made to the accompanying drawings, wherein.

Figure 1:
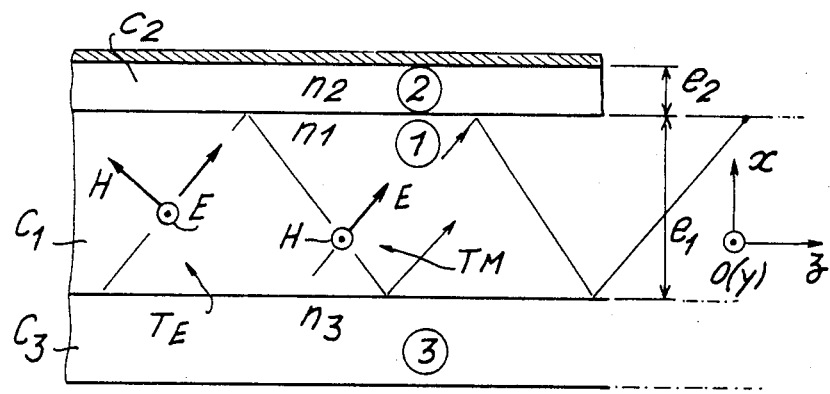
FIG. 1 is a schematic diagram of the optical wave guide in accordance with the invention.

There is shown in FIG. 1 a wave guide in accordance with the invention and comprising a film layer $C_1$ constituted by a material 1 having a refractive index $n_1$ sandwiched between two film layers $C_2$ and $C_3$ constituted by materials 2 and 3 having the respective refractive indices $n_2$ and $n_3$. The face 2 of the layer $C_2$ is coated with a metallic deposit. Two modes propagate within the layer $C_1$. These modes are: the TE mode constituted by a magnetic field in the plane of the figure and a perpendicular electric field, and the TM mode constituted by an electric field in the plane of the figure and a perpendicular magnetic field.

As mentioned earlier, consideration is given to wave guides which are infinite along the direction Oy but the same demonstration applies to wave guides of finite dimension in the same direction, the only difference being that the calculations are more complicated. In the structure under consideration, a particular mode results from the superposition of two plane waves corresponding to the successive total reflections from the top and bottom interfaces of the layer $C_1$ which constitutes the guide. The layer $C_3$ is employed as a material support but can also be a vacuum. The refractive index $n_2$ and $n_3$ are of lower value than the refractive index $n_1$.

In the remaining description, the modes will be represented by the associated electric field, that is:

in the case of the TE mode:

$$a(z, t) = A \exp [i(\omega t - \beta_a z)],$$

and in the case of the TM mode:

$$b(z, t) = B \exp [i(\omega t - \beta_b z)],$$

wherein $A$ eg $B$ are arbitrary constants depending on the level of excitation of the waves; $\beta_a$ and $\beta_b$ are different by virtue of the phase displacements which are different in the case of the two waves and introduced by the reflections from the interfaces 1.2 and 1.3.

When the propagation structure within the layer $C_1$ is disturbed, for example by means of an electric field, a magnetic field, an ultrasonic wave or a mechanical deformation, an energy exchange is produced between the TE, $a(z,t)$ modes and the TM, $b(z,t)$ modes.

The amplitudes A and B are then no longer independent and the law of evolution relating to these latter is written:

$$dA/dz = K_{ab} B \exp (-i \Delta z)$$

$$dB/dz = K_{ba} A \exp (=i \Delta z)$$

This information is valid when it is applied on a large scale with respect to the wavelength of the modes concerned, which is usually the case.

The coupling coefficients $K_{ab}$ and $K_{ba}$ depend on the physical effect employed for carrying out the coupling. This effect will be referred-to in the following description as the perturbation effect. The phase displacement $\Delta$ between the two waves is dependent on $\beta_a$, $\beta_b$ and on the spatial variation of the perturbation. If the materials ①,② and ③ constituting the guide are isotropic and if the perturbation is independent of $z$, the phase displacement $\Delta$ is reduced to:

$$\Delta = \beta_a - \beta_b \neq 0$$

It is in fact established that coupling is satisfactory only when the exchange is resonant, thus resulting in cumulative coupling when phase equality between the two waves is achieved, that is when $\Delta = 0$. In this case, the energy in one mode is continuously transferred into the other mode.

Before making an accurate calculation of the thickness $e_2$ of the film layer $C_2$ to be deposited on the film layer $C_1$, the following discussion will show how phase-tuning can be obtained by adding the dielectric layer $C_2$.

When no metallic layer is deposited on the layer $C_2$, the phase displacement between the TM and TE modes is always positive. In other words, we have:

$$(\Phi_{TM}{}^{12} = \Phi_{TM}{}^{13}) - (\Phi_{TE}{}^{12} + \Phi_{TE}{}^{13}) > 0$$

$\Phi_{Tl}{}^{lm}$ being the phase displacement of the TI wave upon reflection from the interface between the media $l$ and $m$.

It follows from the above inequality that:

$$\beta_b - \beta_a > 0$$

If the metal is deposited directly on the guide, the phase difference at the time of reflection of the TE wave between the media 1 and 2 tends towards $\pi$ and the phase difference introduced at the time of reflection of the TM wave between these two media 1 and 2 tends towards 0. The phase displacement between the TM mode and the TE mode becomes negative:

$$\Phi_{TM}{}^{13} - [\pi + \Phi_{TE}{}^{13}] < 0$$

with the result that $\beta_b - \beta_a < 0$.

If the metal is separated from the guide by a dielectric gap having a thickness $e_2$, it is certainly possible to find a value of this thickness $e_2$ such that the equality $\beta_a = \beta_b$ is satisfied.

The strict application of the Maxwell equations in relation to limiting conditions makes it possible to calculate the phase displacement between the two TE and TM waves resulting from the reflections:

$$(\Phi^{12} + \Phi^{13})_{TM} - (\Phi^{12} - \Phi^{13})_{TE} =$$

$$2\left[\text{arctg}\left\{\frac{\sqrt{N^2-n_2^2}}{\sqrt{n_1^2-N^2}} \cdot \text{th}\left(\sqrt{N^2-n_2^2}\, e_2 \frac{2\pi}{\lambda}\right)\right\} + \right.$$

$$\left. \text{Arctg}\left\{\frac{\sqrt{N^2-n_2^2}}{\sqrt{n_1^2-N^2}} \cdot \frac{n_1^2}{n_2^2}\right\}\right] - 2\left[\text{Arctg}\left\{\frac{\sqrt{N^2-n_2^2}}{\sqrt{n_1^2-N^2}} \cdot \right.\right.$$

$$\left.\left. \frac{1}{\text{th}\left(\sqrt{N^2-n_2^2}\, e_2 \frac{2\pi}{\lambda}\right)}\right\} + \text{Arctg}\frac{\sqrt{N^2-n_3^2}}{\sqrt{n_1^2-N^2}}\right]$$

with $N = n_1 \sin \theta$, where $\theta$ is the angle of refraction of the waves within the layer $C_1$. All the other parameters being known, the equation given above can be solved numerically in order to determine the value of $e_2$ which cancels the phase difference between the two waves. This process is sometimes long and arduous. Since it is known that the solution exists, it is also possible to operate empirically and to determine the optimum value of $e_2$ by successive tests. Another method of determination of the optimum parameters will be described below.

The metallic film layer deposited on the film layer $C_2$ is preferably reflecting in order to reduce the absorption of the light waves.

Figure 2:
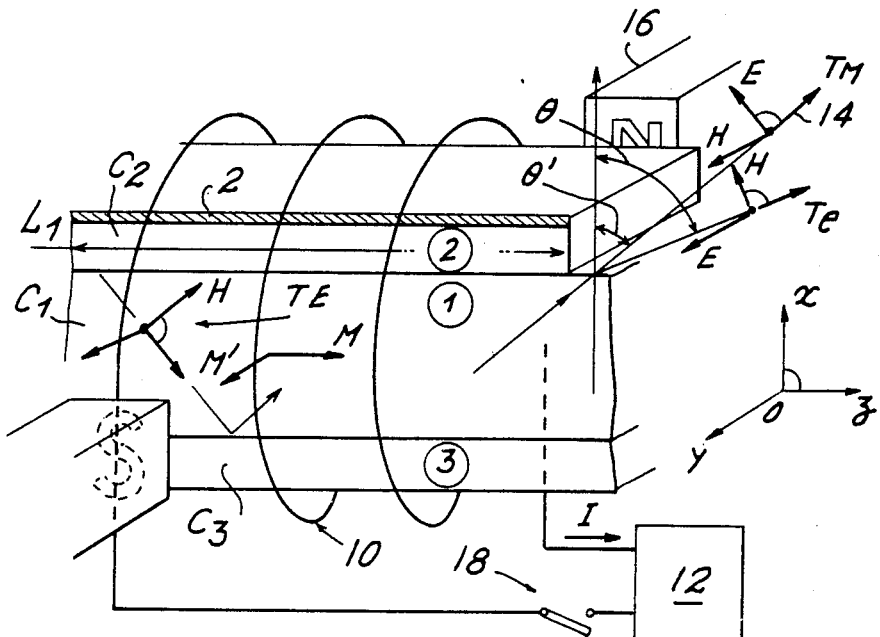
FIG. 2 is a schematic diagram of an optical switch which utilizes magnetizations for the coupling of the TE and TM modes and permits phase-tuning between the two waves which exchange energy.

FIG. 2 illustrates an application of the invention to the construction of a magneto-optical switch. The wave guide designed in accordance with FIG. 2 has a layer $C_3$ of index $n_3$, a layer $C_1$ of index $n_2$ and, over a length $L_1$, a layer $C_2$ of index $n_2$; the top face 2 of said layer is metallized in order to form a metallic mirror. The thickness $e_2$ of said layer is calculated as a function of the formulae which were given earlier in order to effect phase-tuning between two TE and TM modes which propagate within the layer $C_1$. Furthermore, the material $C_1$ is a magnetizable substance having a magnetization M as shown in the figure. It is also possible to employ a non-magnetizable material and to produce only one field B within the layer $C_1$; in this case, the length of the wave guide L increases or else the current I which flows within the solenoid 10 must be of much higher value. The solenoid 10 orients the magnetization M within the material in the direction Oz under the action of the current I delivered by a current source 12 connected to the solenoid. The principle of this switch is to utilize the gyrotropic effect resulting from the magnetization induced in the material so as to convert a TE mode to a TM mode and conversely if so desired. When the magnetization M is zero or has no component in the direction Oz (magnetization M'), the coupling between the TE and TM waves is very small and the mode at the input, for example TE, emerges from the plane of the layer $C_1$ without modification. When the magnetization is directed along Oz (magnetization M), the conversion is of a high order and can attain 100% in the so-called degenerate case, that is, the case in which there is phase equality between the TE and TM modes along the entire length L. The TE mode then becomes a TM mode which emerges from the plane of the layer $C_1$ at an angle $\theta'$. The emergent ray 14 is then switched from the angular position $\theta$ to the position $\theta'$ when the magnetization is switched along the axis Oz.

In the case of magnetic material (ferromagnetic or ferrimagnetic), it can be an advantage to employ a permanent magnet shown diagrammatically at 16 in order to obtain a residual magnetization M' along the axis Oy when it is not desired to couple the modes. if so required, it may then prove useful to switch the magnetization along the axis Oz by operating the switch 18 which supplies current to the solenoid 10.

Maximum conversion of the TE mode to the TM mode is obtained in respect of a length L of interaction equal to:

$$L = \pi/2\theta_f,$$

where $\theta_f$ is the Faraday rotation per unit of length. By way of example, the layer $C_1$ is a magneto-optical garnet having the composition $(GdY)_3 (FeGa)_5 O_{12}$ of index 2.135 at 1.152 $\mu$ deposited on a substrate $C_3$ having the composition $Gd_3 Ga_5 O_{12}$ and of index 1.945. The layer $C_2$ is formed of silica of index 1.456 and the Faraday rotation being 140° C/cm in the case of the material constituting the layer $C_1$, the permissible phase displacement in order to have satisfactory efficiency (higher than 90%) corresponds to a variation in equivalent index N such that:

$$\Delta N < 3 \times 10^{-5}$$

Figure 3:
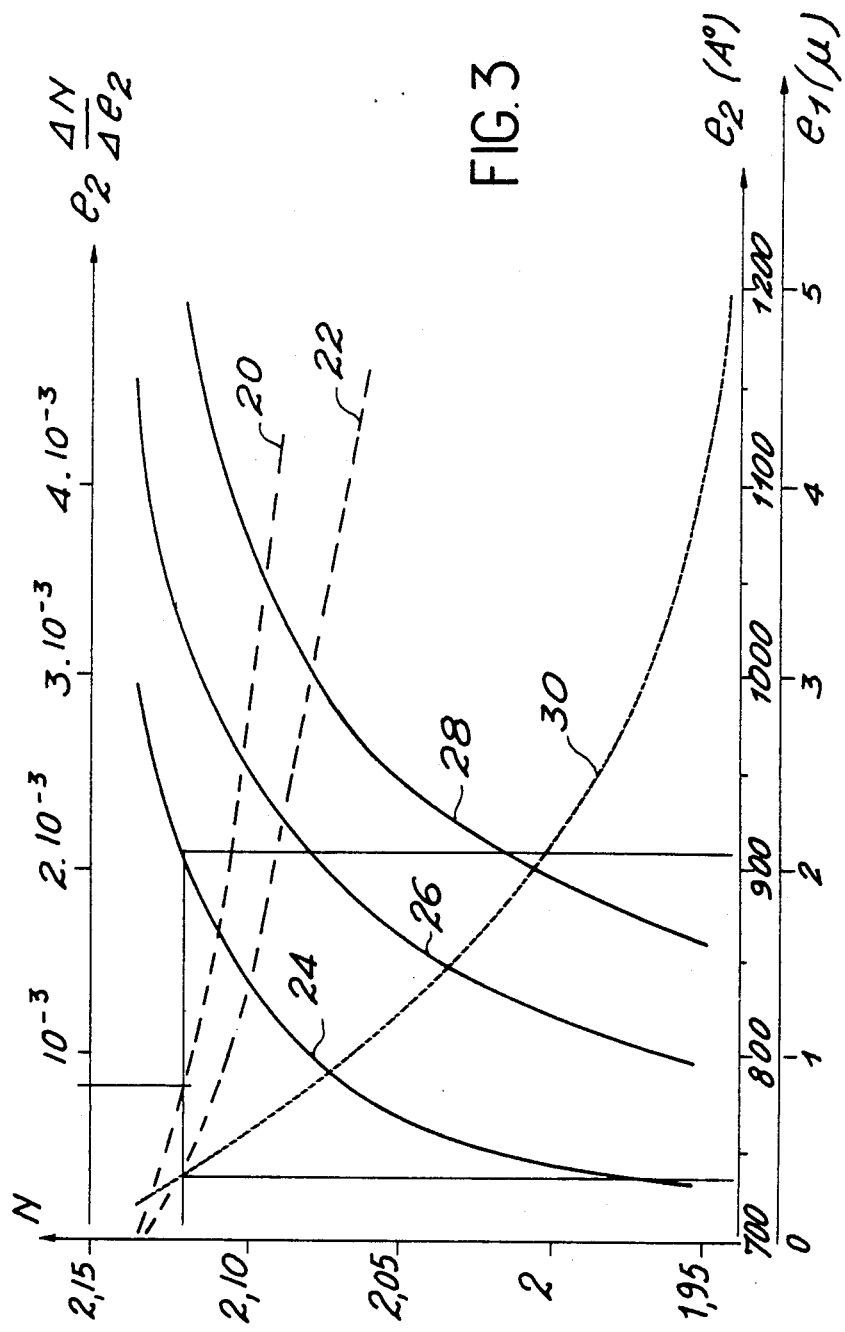
FIG. 3 shows different curves for forming in respect of materials having a given refractive index thicknesses $e_1$ and $e_2$ of the film layers $C_1$ and $C_2$ for reducing the phase displacement.

In FIG. 3, there are shown different curves for producing in the case of materials of given index thicknesses $e_1$ and $e_2$ of the layers $C_1$ and $C_2$ which reduce to a minimum value the phase displacement in respect of a predetermined wavelength. The curves shown in FIG. 3 correspond to a wavelength of 1.152 $\mu$. The indices of the three layers are respectively: $n_1 = 2.135$, $n_2 =$ 1.456, $n_3 = 1.945$. The curve 20 represents in the case of the mode 0 of wave propagation within the layer $C_1$ the variations in the quantity N (equivalent or effective index seen by the guided wave) as a function of the calculated quantity $e_2$ ($\Delta N/\Delta e_2$).

Relative variations in thickness of silica of 4% are feasible. In order to obtain as an end result $\Delta N < 3 \times 10^{-5}$ with ($\Delta e_2/e_2$) ~ $4 \times 10^{-2}$, the ratio $e_2 \Delta N/\Delta e_2$ must be lower than $0.8 \times 10^{-3}$. It is apparent from the curve 20 which corresponds to the mode O that, if the value $N > 2.12$ is adopted, the above-mentioned inequality is verified.

The same values in the case of the mode 1 are represented on the curve 22.

As is readily apparent, it will be endeavored to couple TE and TM modes having the same index such as the modes O, for example. If the equivalent index N which is plotted as ordinates in FIG. 3 is accordingly adopted as the equivalent index to be attained, curve 24 is employed for mode O, curve 26 for mode 1 and curve 28 for mode 2 thus producing the variations in said equivalent index N as a function of the thickness $e_1$ of the layer $C_1$. In the case of the mode O and in order to obtain $N = 2.12$, it is clearly necessary to select the thickness $e_1$ which is equal to approximately 2.1 microns. Similarly, in order to obtain the same equivalent index $N$, the thickness $e_2$ of the layer $C_2$ is selected by means of the curve 30 which represents, irrespective of the mode, the variation in equivalent index $N$ as a function of the thickness $e_2$ of the layer $C_2$. According to said curve 30, $N = 2.12$ corresponds to a thickness $e_2$ of silica which is equal to 735 microns. In short, we have $e_1 = 2.1$ microns, $e_2 = 735$ A $\pm$ 30 A and the phase displacement $\Delta$ is smaller than $3 \times 10^{-5}$, this being sufficient to ensure a modulation efficiency which is higher than 90%.

Figure 4:
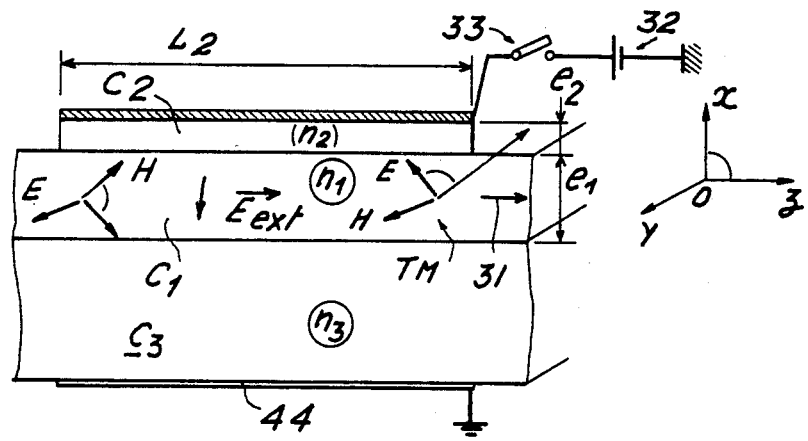
FIG. 4 is a schematic diagram of a wave guide for carrying out an exchange of energy between two modes, coupling being effected by means of a second type of polarization.

There is shown in FIG. 4 one example of construction of a switch in accordance with the invention, this latter being fabricated by means of an electro-optical material which constitutes the layer $C_1$. The direction of wave propagation being shown by the arrow 31, the layer $C_1$ is covered over the distance $L_2$ with a layer $C_2$ having an index $n_2$. The thicknesses $e_1$ and $e_2$ of these different layers $C_1$ and $C_2$ are calculated in the same manner as before. In order to facilitate coupling, use is made of the electro-optical effect induced by a field $\vec{E}_{ext}$ as shown in the figure and obtained by means of two electrodes 42 and 44 which are placed on each side of the layers $C_1$, $C_2$ and $C_3$. The influence of this external field is such that the electro-optical material constituting the layer $C_1$ (KDP, for example) becomes birefringent. By suitably orienting its optical axes in the plane Oxy and by suitably choosing the length $L_2$ and the applied external field (as a function of the physical characteristics of the electro-optical material), the portion of wave-guide having a length $L_2$ can be made to perform the function of a half-wave plate which causes the polarization to rotate through an angle of 90°, that is, which converts the TE wave to a TM wave. In order to ensure good efficiency in the guided mode, phase-tuning must be carried out throughout the entire propagation and it is for this reason that the layer $C_2$ is placed next to the layer $C_1$ in accordance with the invention. The voltage source is shown diagrammatically at 32 and voltage switching can be initiated at will by opening or closing the switch 33. The voltage is applied between the electrodes 42 and 44.

Figure 5:
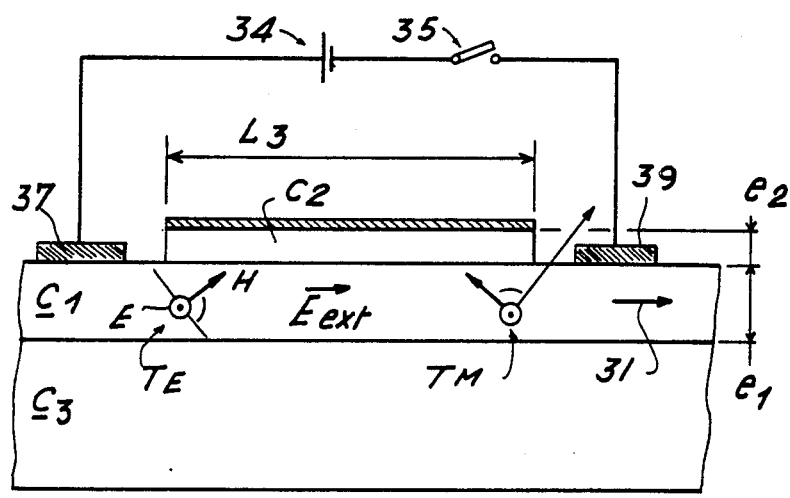
FIG. 5 is a schematic diagram of a wave guide for carrying out an exchange of energy between two modes, coupling being effected by means of a first type of polarization with phase-tuning throughout the energy transfer.

There is shown in FIG. 5 another embodiment of electro-optical switch which utilizes a longitudinal electric field E obtained by two electrodes 37 and 39 which produce the field $\vec{E}_{ext}$ as shown in FIG. 5. A dry cell 34 applies voltage to the plates 37 and 39 by means of a switch 35. Again by virtue of the electro-optical effect, it is possible with this orientation of the field $\vec{E}_{ext}$ to ensure that the portion of guide located within the length $L_3$ performs the function of a half-wave plate which converts an electric wave into a magnetic wave by rotation of the polarization through 90°.

The only examples indicated concern wave guides having flat faces. However, it is clearly apparent that guides having curved faces and corresponding to the characteristics of the invention are included in the scope of this latter.

Moreover, it has been mentioned throughout the foregoing description that the layer deposited on the layer $C_2$ was metallic; however, it is evident that this invention is concerned with the optical properties of this layer and that it would be possible within the scope of the invention to employ all materials having optical properties of a metallic type such as certain semiconductors, for example.

What we claim is:

1. An optical wave guide for carrying out phase tuning between two modes of light propagation of waves within said guide, wherein said guide comprises first layer $C_1$ of optical index $n_1$, a second layer $C_2$ comprising a dielectric material having an optical index $n_2$ ($n_2 < n_1$) which is adjacent to said first layer and has a thickness $e_2$ determined by the equation:

$$2\left[\arctg\left\{\frac{\sqrt{N^2-n_2^2}}{\sqrt{n_1^2-N^2}} \cdot \th\left[\sqrt{N^2-n_2^2}\, e_2 \frac{2\pi}{\lambda}\right]\right\}\right.+$$

$$\left.\Arctg\left\{\frac{\sqrt{N^2-n_2^2}}{\sqrt{n_1^2-N^2}} \frac{n_1^2}{n_2^2}\right\}\right] - 2\left[\Arctg\left\{\frac{\sqrt{N^2-n_2^2}}{\sqrt{n_1^2-N^2}}\right.\right.$$

$$\left.\left.\frac{1}{\th\left(\sqrt{N^2-n_2^2}\, e_2 \frac{2\pi}{\lambda}\right)}\right\} + \Arctg\frac{\sqrt{N^2-n_3^2}}{\sqrt{n_1^2-N^2}}\right] = 0$$

with $N = n_1 \sin \theta$, where $\theta$ is the angle of refraction of the waves within the layer $C_1$ and $n_3$ ($n_3 < n_1$) the optical index of the volume below layer $C_2$; and a coating having optical properties of a metallic type and deposited on the face of the layer $C_2$, said face being located opposite to the flat face which is common to the layers $C_1$ and $C_2$.

2. A wave guide according to claim 1, wherein one of said modes is a TE mode and the other of said modes is a TM mode.

3. A wave guide according to claim 1, wherein the first layer $C_1$ is a layer of magnetic material.

4. A wave guide according to claim 3, wherein said guide further comprises means for producing in a controlled manner a magnetic field which is substantially parallel to the faces of the layer $C_1$ and directed parallel to the common direction of propagation of said modes.

5. A wave guide according to claim 3, wherein said guide further comprises means for switching a magnetic field between two directions perpendicular to each other and parallel to the faces of the layer $C_1$, one direction being parallel to the direction of propagation of the two modes and the other direction being perpendicular.

6. A wave guide according to claim 1, wherein the first layer $C_1$ comprises a material which is polarizable by an electric field.

7. A wave guide according to claim 6, wherein said guide further comprises electrical means for producing by means of an external control an electric field which is parallel to the two flat faces of the layer $C_1$ and to the common direction of propagation of said modes.

8. A wave guide according to claim 6, wherein said guide further comprises electrical means for producing by means of an external control an electric field which is perpendicular to the common direction of propagation of said modes.

9. An optical wave guide according to claim 1, wherein
the layer $C_1$ is formed of magnetic material, and
said coating comprises a reflecting metallic deposit, further comprising
means for switching a magnetic field within the layer $C_1$,
and wherein the length L over which the layer $C_2$ covers the layer $C_1$ is substantially equal to $\pi/2\theta_f$,
where $\theta_f$ is the Faraday rotation per unit of length within the material constituting the layer $C_1$.

10. A wave guide according to claim 9, wherein the layer $C_1$ is a magneto-optical garnet.

11. A wave guide according to claim 9, wherein the layer $C_2$ is of silica.

* * * * *